United States Patent [19]

Lettinga

[11] 4,258,707
[45] Mar. 31, 1981

[54] THERAPEUTIC TRACTION APPARATUS FOR APPLYING TRACTION TO A PATIENT BY MEANS OF A DRAWING CABLE

[75] Inventor: Jan Lettinga, Maasland, Netherlands

[73] Assignee: N.V. Verenigde Instrumentenfabrieken Enraf-Nonius, Delft, Netherlands

[21] Appl. No.: 841,387

[22] Filed: Oct. 12, 1977

[30] Foreign Application Priority Data

Oct. 15, 1976 [NL] Netherlands ............... 7611461

[51] Int. Cl.³ .................................... A61H 1/02
[52] U.S. Cl. ............................................. 128/75
[58] Field of Search ............... 128/75, 76 R, 71; 254/173 B, 173 R, 84 R; 73/788, 805, 806, 808, 88; 242/75.51

[56] References Cited

U.S. PATENT DOCUMENTS

| 2,298,222 | 10/1942 | McShane | 254/173 B |
| 2,609,181 | 9/1952 | Jaeschke | 254/173 B |
| 2,811,965 | 11/1957 | Richards | 128/75 |
| 2,940,442 | 6/1960 | Wilhelm | 128/75 |
| 3,168,094 | 2/1965 | Hamaki | 128/75 |
| 3,710,787 | 1/1973 | Rabjohn | 128/75 |
| 3,786,803 | 6/1974 | Petulla | 128/75 |
| 3,835,847 | 9/1974 | Smith | 128/75 |
| 3,942,081 | 3/1976 | Liska et al. | 242/75.51 |

OTHER PUBLICATIONS

Mejnanical Engineers Hand Book, Lionel S. Marks, pp. 2000-20007, 4th ed., Jun. 1941.
Advertisement, Hausted Manufacturing Co., Medina, Ohio Journal Bone and Joint Surgury Jul., '56, p. 8 vol. 38A.

Primary Examiner—John D. Yasko
Attorney, Agent, or Firm—Lane, Aitken, Ziems, Kice & Kananen

[57] ABSTRACT

A traction apparatus for medical purposes, wherein an adjustable traction generated by an electromotor is transmitted to the body of a patient by means of a drawing cable. The traction appearing in the drawing cable is continuously measured and compared with the selected traction magnitude, and the drawing cable is wound or unwound by the electromotor in dependence on the difference established by the comparison until this difference has at least approximately been reduced to zero. Preferably, an intermittent traction is exerted, in such manner that holding periods in which the full traction is applied are interrupted by rest periods, in which an adjustable rest force different from zero is exerted. The traction appearing in the drawing cable may be measured by passing the cable over a shaft on which a flexional load is exerted by the traction and by arranging strain gauges on said shaft.

10 Claims, 6 Drawing Figures

THERAPEUTIC TRACTION APPARATUS FOR APPLYING TRACTION TO A PATIENT BY MEANS OF A DRAWING CABLE

BACKGROUND OF THE INVENTION

U.S. Pat. Nos. 3,168,094 (Siltamaki) and 3,835,847 (Smith) disclose traction apparatus in which the traction is controlled by means of an adjustable spring-loaded lever responding to the tension in the drawing cable. This lever operates a switch when the desired traction has been reached, whereby the motor is switched off, and a timer is actuated to reverse the motor after a predetermined delay. An arrangement of this kind has the disadvantage that no correction is possible for an excessive traction magnitude, due for instance to a shift of the position of the patient.

U.S. Pat. No. 3,710,787 discloses a similar arrangement wherein the lever is constituted by the motor, which is pivotably suspended. In order to prevent an excessive traction magnitude, the disclosure relies on a limitation of the current that may be supplied to the motor.

SUMMARY OF THE INVENTION

It is the object of the invention to provide an improved apparatus of the above-mentioned kind, wherein the traction exerted on the patient is accurately kept at a desired value.

Further objects of the invention will appear from the following description.

According to the invention, the generated traction is continuously and electrically measured and compared with the selected traction intensity, and the drawing cable is wound or unwound in dependence on the difference established by the comparison until this difference has at least approximately been reduced to zero.

The apparatus according to the invention may be constructed as a separate device adapted to be attached to a wall, a bed or a chair, but it may also be incorporated in a traction table or a traction chair.

Since it must be possible to increase or to decrease the traction intensity, according to circumstances, the electromotor used in the apparatus must be readily reversible, and must also be able to generate a large torque in the stationary condition. These exigencies may be satisfied in an appropriate manner by the use of a D.C. motor.

In many cases, the treatment is performed in such manner that the exertion of the full traction is interrupted by rest periods, and it is generally desirable that the traction is not completely suppressed in these rest periods. The apparatus according to the invention may be easily constructed in such manner that an adjustable rest force different from zero is exerted in the rest periods. The use of a D.C. motor is also very useful in this respect, because there is a linear relation between the supplied current and the exerted torque in such a motor, so that the traction intensity may be readily controlled by a variation of the supplied current.

In general, it is considered desirable that the full traction is gradually switched on and off. For this purpose, the apparatus according to the invention may be carried out in such manner that the course of the traction as a function of time during the transitions from zero or from the rest force to the full traction, and from the full traction to zero or to the rest force is continuously adjustable.

It is preferred to insert an electromagnetic coupling between the motor and the drawing cable. This has the advantage that the drawing cable may be rapidly drawn out in the decoupled condition in order to connect it with the patient, and that the patient may interrupt the traction at any time by disabling the electromagnetic coupling by means of an emergency switch. In addition, the patient is automatically decoupled when the voltage supply is interrupted. The use of an electromagnetic coupling also provides for an additional protection, since the traction intensity can never become larger than the value corresponding with the slipping torque of the coupling. In a preferred embodiment of the invention, the slipping torque of the coupling is automatically adapted to the selected traction intensity, in such manner that the slipping coupling is always slightly larger than the value corresponding with the selected traction intensity.

The winding drum used for winding and unwinding the cable is preferably connected with the motor through a unidirectional coupling. This is important for the case that the drawing cable is completely unwound from the winding drum. In this condition, a command to unwind the cable may cause the same to be rewound in the opposite direction, whereby the traction intensity is increased instead of decreased. This danger may be removed by the use of a unidirectional coupling.

It is essential to the invention that the traction intensity in the drawing cable is continuously measured. This may be realized in an effective manner by passing the drawing cable over a shaft on which a flexional load is exerted by the traction, and by arranging strain gauges on said shaft in order to measure the generated traction.

In order to control the exerted traction in an effective manner it is preferred that a voltage corresponding with the selected traction intensity, or the selected rest force, respectively, is supplied to one of the inputs of an operational amplifier, and that the amplified voltage is fed back to another input of said amplifier through an integrator having an adjustable time constant, so that the voltage of said other input follows the voltage of said first-mentioned input with an adjustable delay. In this case, it is useful that the output voltage of the integrator is compared with a voltage corresponding with the actual traction, and the difference established by this comparison is used to control the current supplied to the electromotor.

If the apparatus comprises means for measuring the duration of the traction periods and the rest periods, it is preferable that the said measuring means are activated at the moments at which the full traction intensity, or the rest force, respectively, has at least approximately reached the selected value.

SHORT DESCRIPTION OF THE DRAWINGS

DETAILED DESCRIPTION

Figure 1:
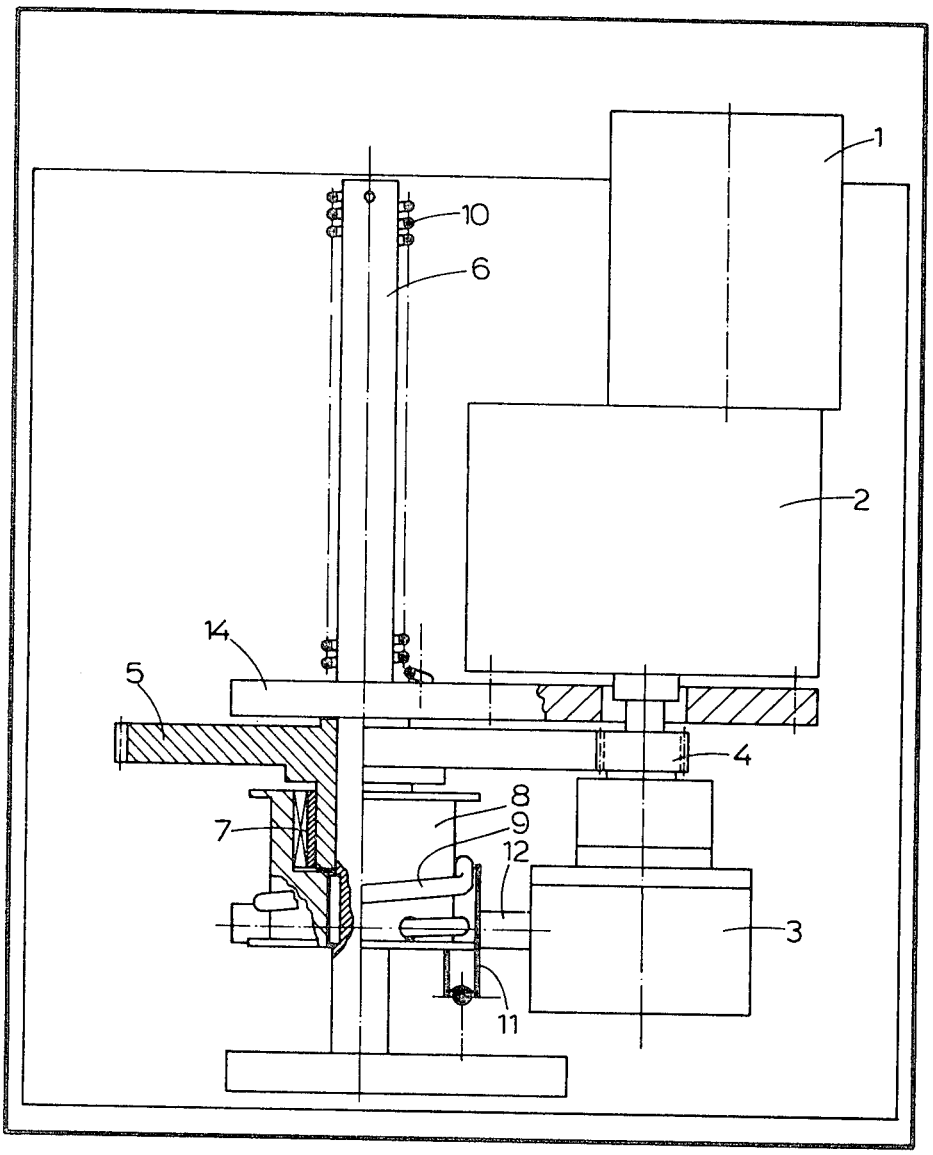
FIG. 1 shows an apparatus according to the invention, partially in top view, and partially in a horizontal section.
Figure 2:
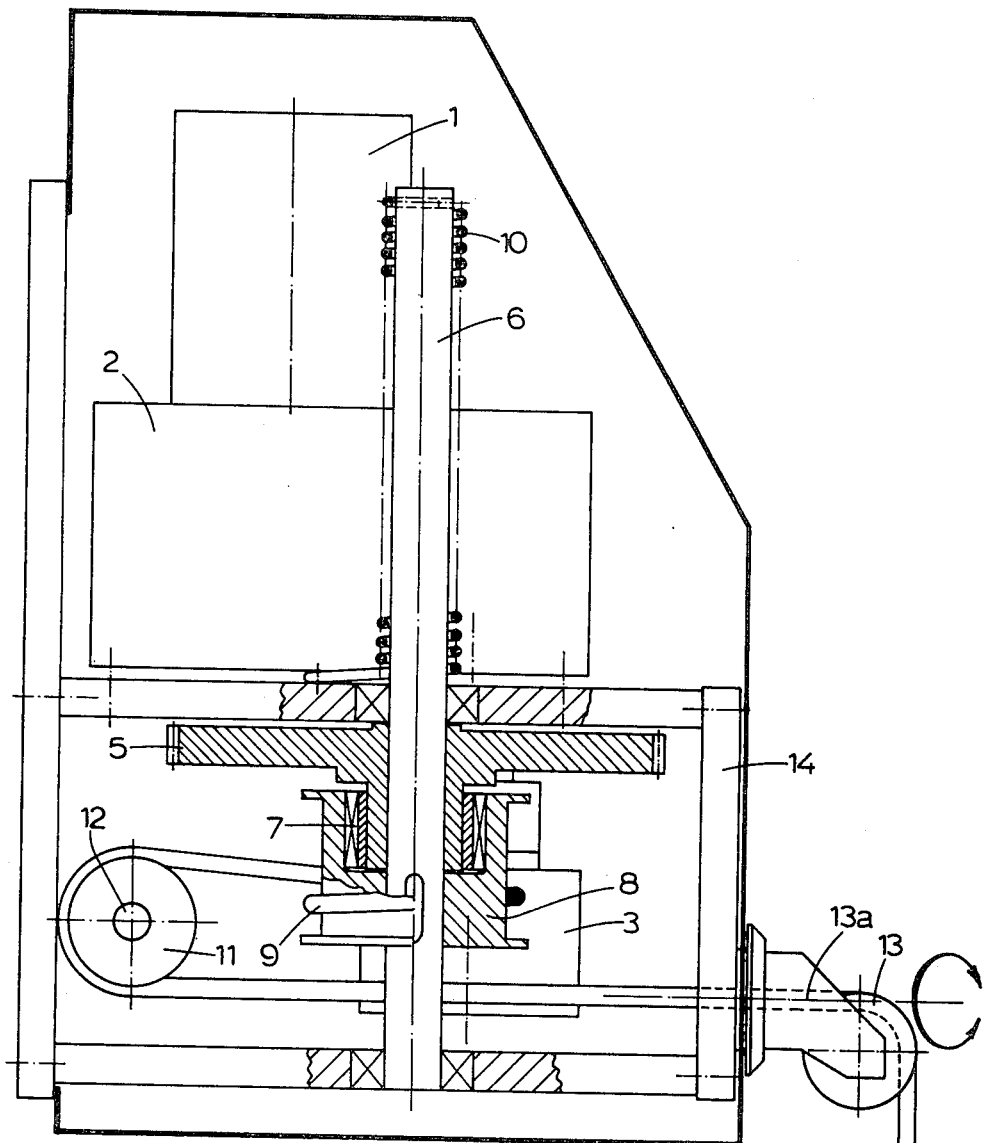
FIG. 2 shows a section of the apparatus as shown in FIG. 1 along a plane perpendicular to the plane of section in FIG. 1.
Figure 3:
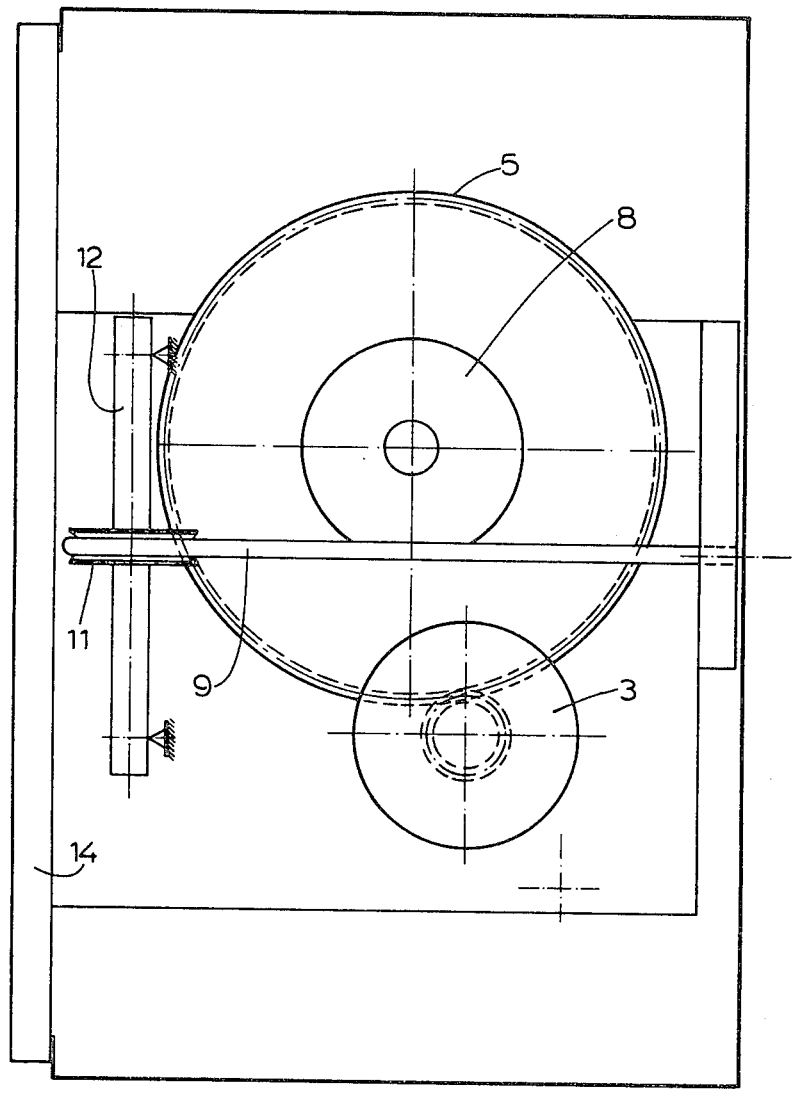
FIG. 3 shows a side view of the apparatus as shown in FIGS. 1 and 2.

The apparatus shown in FIGS. 1–3 comprises a D.C. motor 1 generating the traction, of which the shaft is connected with a reducing transmission 2. The output shaft of the transmission 2 may be coupled by means of an electromagnetic coupling 3 with a pinion 4 engaging a gear wheel 5. The gear wheel 5 is freely rotatable about a shaft 6 and is provided with a hub coupled through a unidirectional coupling 7 with a winding drum 8 keyed to the shaft 6.

One of the ends of a spring 10 is attached to the shaft 6, while the other end is attached to a frame 14. When the end of the cable 9 is to be connected with the patient, the electromagnetic coupling 3 is left inactive, so that the cable 9 may be freely drawn out by hand. During this operation the spring 10 is wound up, so that it may rewind the cable 9 on the winding drum 8 after the treatment. When the electromagnetic coupling has been actuated and the treatment has been started, but the required traction intensity has not yet been reached, the motor is actuated in the direction in which a greater part of the cable is wound on the drum, so that the traction intensity increases, until an equilibrium between the required and the actual traction intensities has been reached.

The command "increase traction" corresponds with a fixed direction of rotation of the motor, However, if the drawing cable 9 is arranged on the drum in the opposite direction, which is possible if the cable has been completely unwound, the above-mentioned correlation between the variation of the traction intensity and the direction of rotation of the motor is no longer present. This might lead to a dangerous situation, which is prevented, however, by the unidirectional coupling 7.

The drawing cable 9 is led over a pulley 11, which is freely rotatable around a measuring shaft 12, so that the measuring shaft 12 is subjected to a flexional load by the traction in the drawing cable. Strain gauges for measuring the traction have been stuck to the shaft 12. The drawing cable is led out of the apparatus over a pulley 13, and connected with the patient to be treated. The pulley 13 is freely rotatable around a shaft 13a.

According to the drawings, the traction operative in the cable works in a horizontal direction. However, any desired direction within a semisphere is possible.

The rotating parts of the apparatus are borne by the frame 14.

Figure 4:
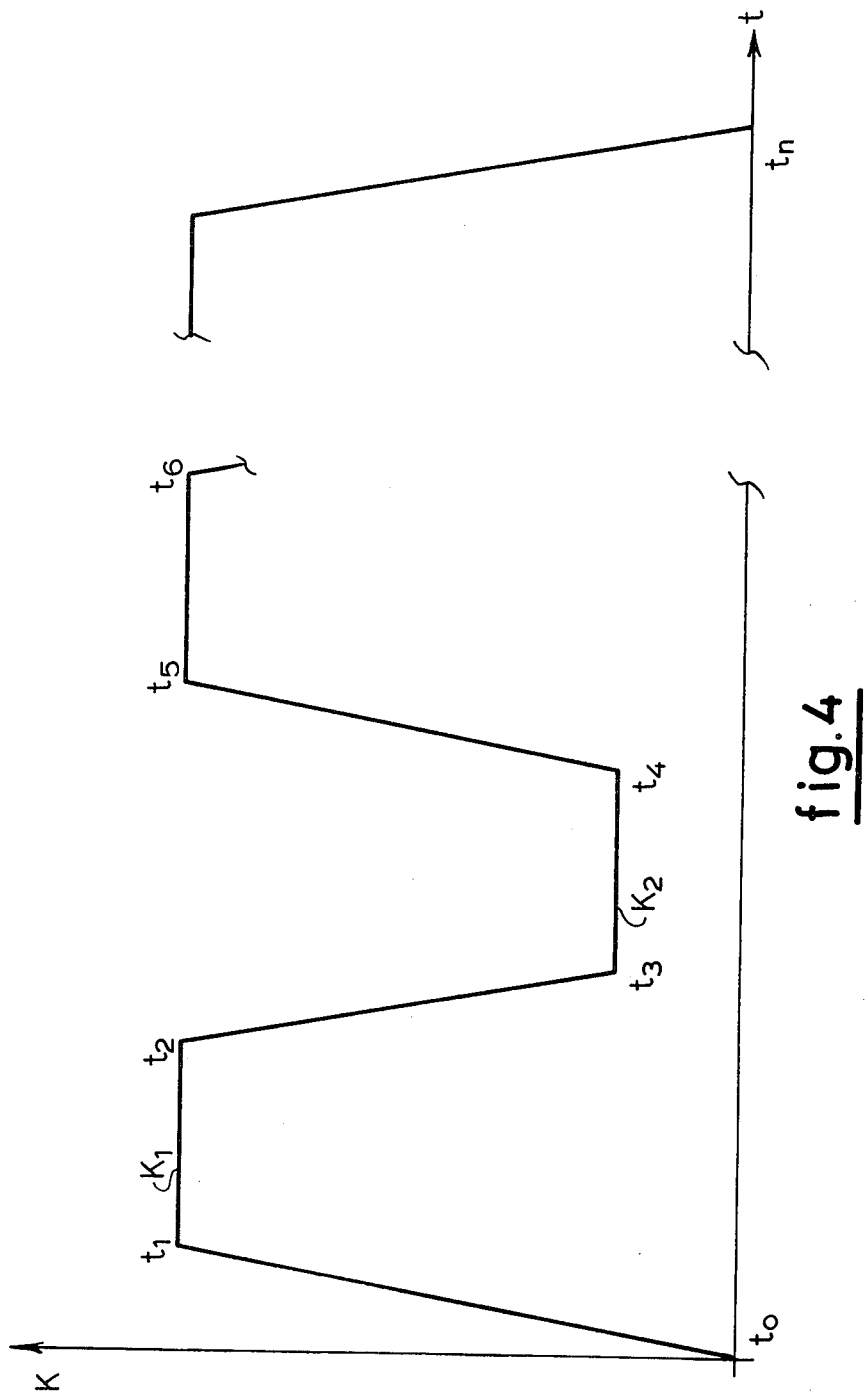
FIG. 4 shows an example of a timing program that may be used in a treatment with the apparatus as shown in FIGS. 1-3.

FIG. 4 shows a timing program that may be used in a treatment with the apparatus according to the invention. The apparatus is actuated at the time $t_o$, after which the traction is gradually increased up to the selected value $K_1$, which is reached at the time $t_1$ and maintained up to the time $t_2$. The interval $(t_2-t_1)$ is indicated as the drawing time. After the time $t_2$ the traction is gradually decreased to the rest value $K_2$, which is reached at the time $t_3$, and maintained up to the time $t_4$. The interval $(t_4-t_3)$ is indicated as the rest time. After the time $t_4$, the traction is again gradually increased up to the value $K_1$ which is reached at the time $t_5$, and maintained up to the time $t_6$, and so on. The intervals $(t_1-t_o)$, $(t_3-t_2)$ and $(t_5-t_4)$ may be indicated as adaptation times. At the time $t_n$, the treatment is terminated, so that the interval $(t_n-t_o)$ may be indicated as the treating time.

In an apparatus according to the invention, the traction intensity may be variable from 0 to 100 kg, while the drawing and rest times may each be variable between 0 and 60 seconds, the adaptation time between 1 and 30 seconds, and the treating time between 0 and 100 minutes.

Figure 5:
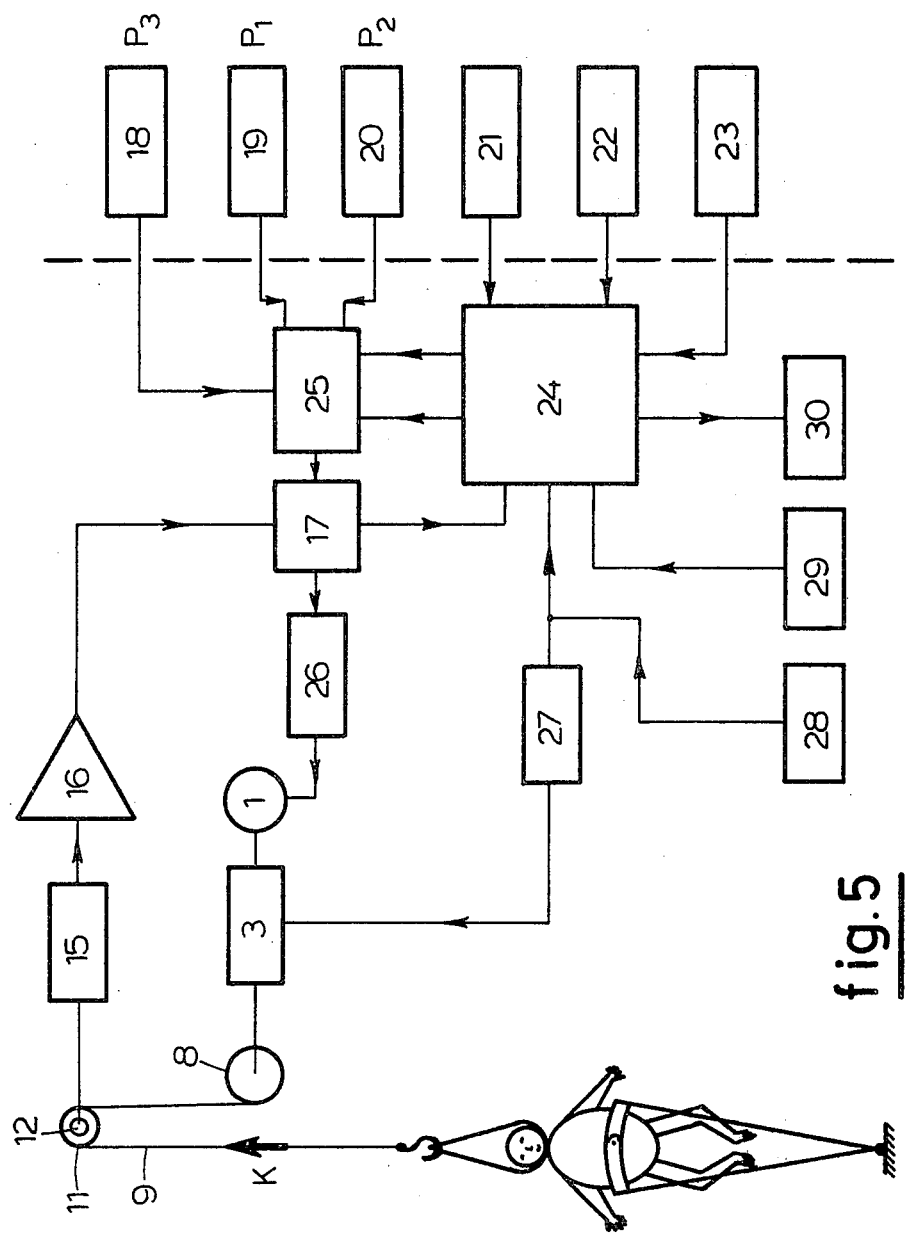
FIG. 5 shows a block diagram of the apparatus as shown in FIGS. 1–3.

FIG. 5 shows a block diagram of an apparatus according to the invention.

The measuring shaft 12 is provided with a transducer 15 converting the traction intensity into an electric signal which is transmitted through an amplifier 16 to a comparator 17. The apparatus is further provided with adjusting members 18, 19 and 20 for the slope of the traction intensity during the adaptation times, the traction intensity and the rest force, respectively. Adjusting members 21, 22 and 23 are provided for the drawing time, the rest time and the treating time, respectively. The adjusting members 21, 22 and 23 are connected with a logical circuit 24, controlling a switching member 25. The values selected by means of the adjusting members 18, 19 and 20 are transferred to the comparator 17 by means of the switching member 25.

The comparator 17 controls the logical circuit 24 and provides an input voltage for an amplifier 26 controlling the electromotor 1. This motor is connected through the electromagnetic coupling 3 with the winding drum 8. The electromagnetic coupling 3 may be disabled by the patient by means of an emergency button 27. Furthermore, the apparatus contains a stop button 28, a start button 29 and an indicator 30 for reading out the times.

Figure 6:
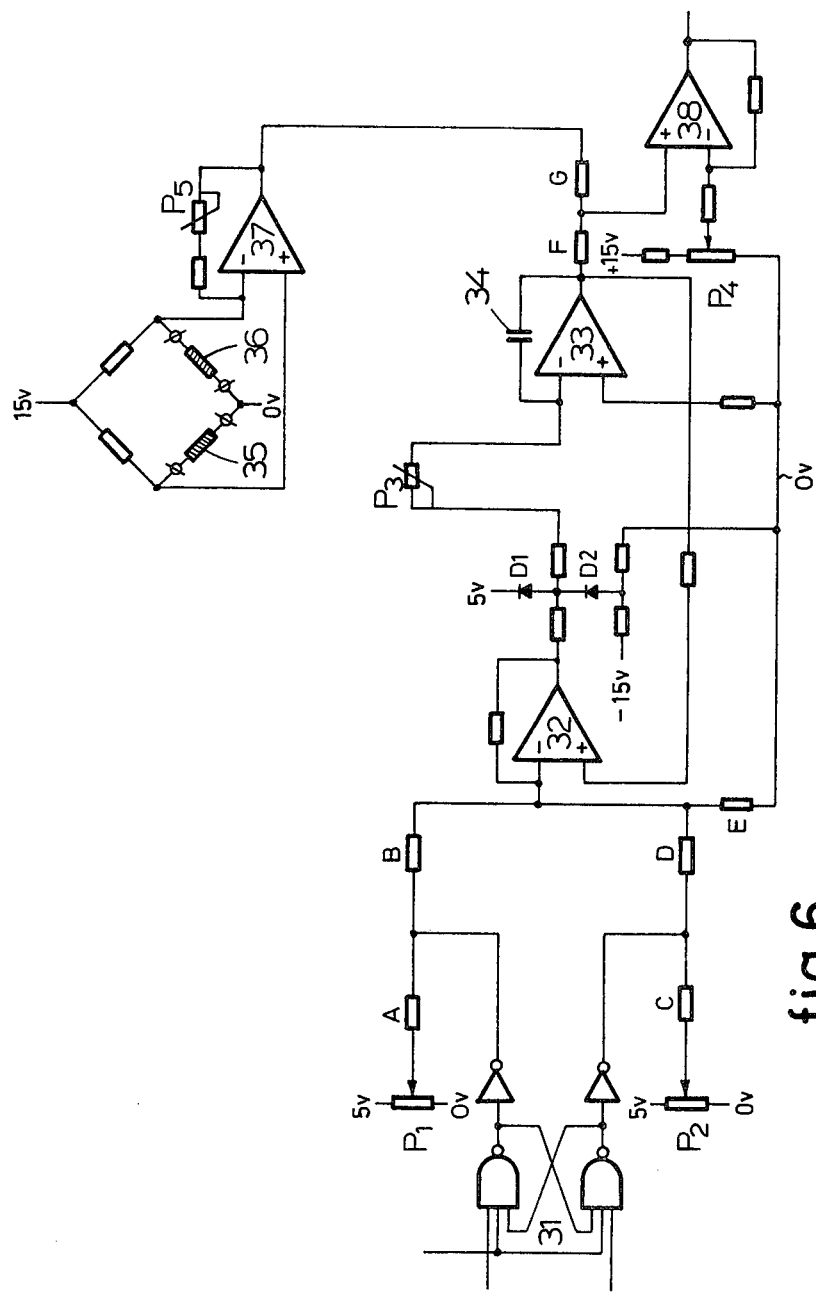
FIG. 6 shows a circuit diagram of the means for controlling the traction intensity.

In FIG. 6, $P_1$ and $P_2$ are potentiometers for adjusting the traction intensity and the rest force, respectively. The said potentiometers are actuated at the right times by means of a flip-flop 31, consisting of two nand-gates. The wipers of the potentiometers $P_1$ and $P_2$ are connected, through series connected resistors A and B, and through series connected resistors C and D, respectively, with the inverting input of an operational amplifier 32.

As long as the apparatus is inoperative, the junctions between resistors A and B, and between resistors C and D each have a voltage 0, so that the potentiometers $P_1$ and $P_2$ are inactive. By means of the flip-flop 31, the 0-voltage may be removed from any one of the junctions. In this case, a predetermined fraction of the voltage adjusted on the potentiometer $P_1$ or $P_2$ is supplied to the inverting input of the amplifier 32. The output voltage of the amplifier 32 is supplied, through a full-wave limiter consisting of diodes $D_1$ and $D_2$, to an integrator consisting of an input resistor $P_3$ and an operational amplifier 33 with feed-back through a condenser 34. The output voltage of the amplifier 33 is fed back to the non-inverting input of the amplifier 32, so that the voltage at this input follows the voltage at the inverting input with a delay determined by the adjustment of the potentiometer $P_3$. In this manner, the required gradual change-over to the full traction intensity is obtained. The measuring shaft 12 carries strain gauges 35 and 36 inserted in a bridge of which the output signal is supplied to an operational amplifier 37. The output voltages of the amplifiers 33 and 37 are compared by means of resistors F and G, and the established voltage difference controls the motor current by means of an operational amplifier 38.

The measuring means for the duration of the traction periods and the rest periods are preferably activated at the moments at which the full traction intensity or the rest force, respectively, has at least approximately reached the selected value. In view of the inevitable inaccuracy of the force control the activation of the measuring means must occur with a force tolerance of a few percents.

I claim:

1. A therapeutic traction applying apparatus for subjecting a patient to applications of traction, said apparatus comprising a drawing cable adapted to be attached to the body of said patient, an electromotor for winding and unwinding said drawing cable in order to generate a desired traction intensity in the cable, electric means for continuously measuring the traction intensity appearing in said drawing cable, means for comparing the measured traction intensity with a predetermined desired traction intensity, and means responsive to the difference established by said comparing means for actuating said electromotor whereby the tension of said drawing cable is varied until said difference has been reduced to at least approximately zero.

2. A therapeutic traction applying apparatus for subjecting a patient to applications of traction, said apparatus comprising a cable adapted to be attached to the body of said patient, an electromotor for winding and unwinding said drawing cable in order to generate a desired traction intensity in the cable, electric means for continuously measuring the traction intensity appearing in said drawing cable, means for comparing the measured traction intensity with a predetermined desired traction intensity, means responsive to the difference established by said comparing means for actuating said electromotor whereby the tension of said drawing cable is varied until said difference has been reduced to at least approximately zero, and means for exerting said full predetermined traction intensity during holding periods and for exerting an adjustable rest force different from zero during rest periods alternating with the said holding periods.

3. Therapeutic traction apparatus according to claim 2, further comprising means for continuously adjusting the course of the traction intensity as a function of time during the transitions between the holding and the rest periods.

4. Therapeutic traction apparatus according to claim 3, further comprising an operational amplifier having a plurality of inputs, means for supplying a voltage corresponding with a desired traction intensity to a first one of said inputs, an integrator having an adjustable time constant, means for supplying the output voltage of said amplifier to said integrator, and means for supplying the output voltage of said integrator to another one of the inputs of said amplifier so that the voltage of said other input follows the voltage of said first input with an adjustable time delay.

5. Therapeutic traction apparatus according to claim 4, further comprising means for comparing the output voltage of said integrator with a voltage corresponding to the actual traction intensity, and means for controlling the current supplied to said electromotor depending upon the difference established by said voltage comparing means.

6. Therapeutic traction apparatus according to claim 2, further comprising means for measuring the duration of the holding and rest periods, and means for activating said measuring means at the time the traction intensity desired during the period in question has at least approximately been reached.

7. Therapeutic traction apparatus according to claim 2, further comprising an electromagnetic coupling inserted between the electromotor and said drawing cable.

8. Therapeutic traction apparatus according to claim 7, further comprising means for adapting the slipping torque of said electromagnetic coupling to the desired traction intensity so that said slipping torque is always slightly larger than the torque corresponding with the desired traction intensity.

9. Therapeutic traction apparatus according to claim 2, further comprising a drum for winding and unwinding said drawing cable, and a unidirectional coupling connecting said drum with said electromotor.

10. A therapeutic traction applying apparatus for subjecting a patient to applications of traction, said apparatus comprising a drawing cable adapted to be attached to the body of said patient, an electromotor for winding and unwinding said drawing cable in order to generate a desired traction intensity in the cable, electric means for continuously measuring the traction intensity appearing in said drawing cable, means for comparing the measured traction intensity with a predetermined desired traction intensity, means responsive to the difference established by said comparing means for actuating said electromotor whereby the tension of said drawing cable is varied until said difference has been reduced to at least approximately zero, a measuring shaft, means for passing said drawing cable over said measuring shaft in such manner that the traction exerts a flexional load on said measuring shaft, and a plurality of strain gauges on said measuring shaft to measure the traction intensity appearing in said drawing cable.

* * * * *